April 29, 1924.
C. C. CLEMENT
BARBECUE STOVE
Filed Nov. 14, 1923
1,491,945
2 Sheets-Sheet 1
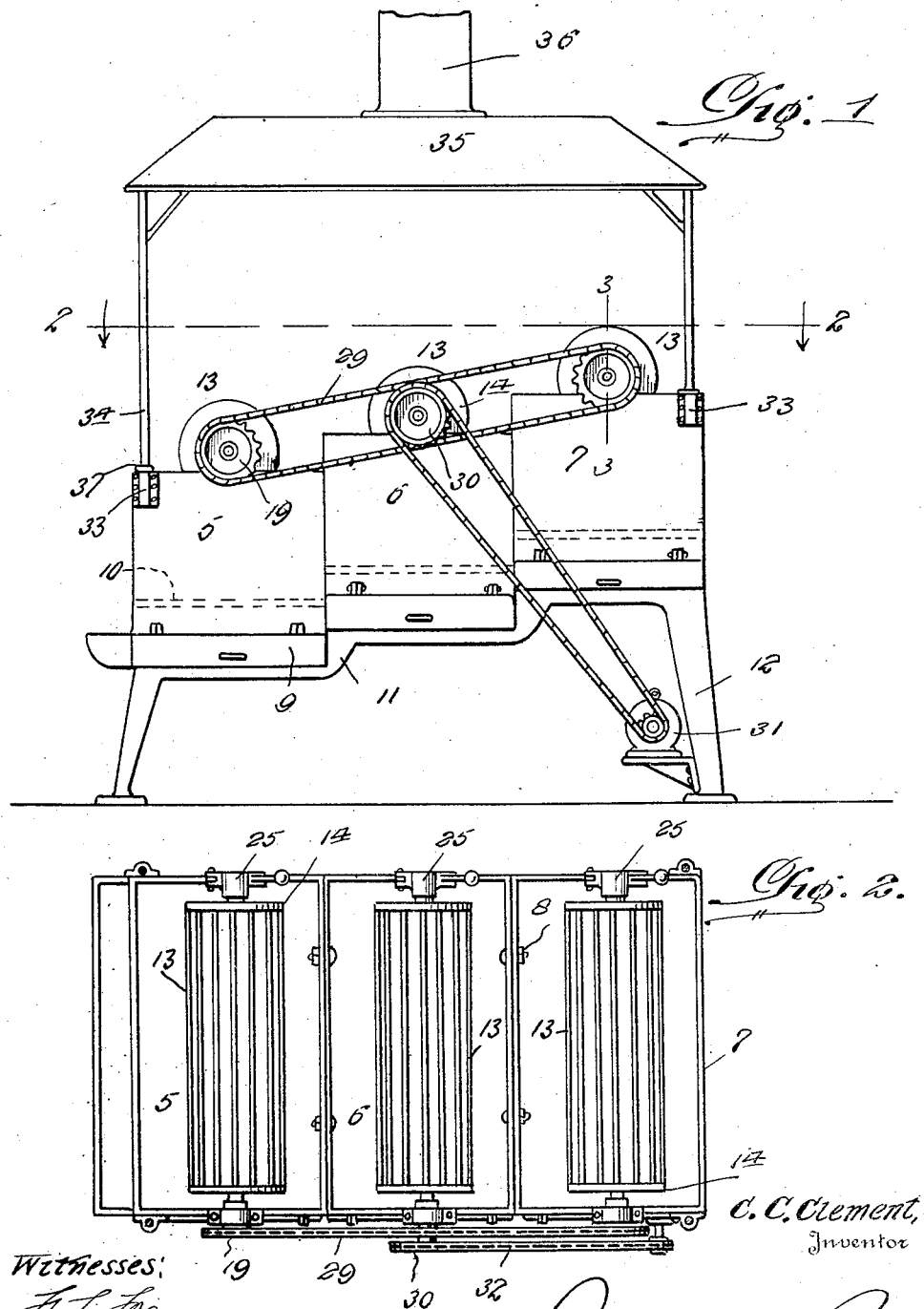

April 29, 1924.  C. C. CLEMENT  1,491,945
BARBECUE STOVE
Filed Nov. 14, 1923    2 Sheets-Sheet 2
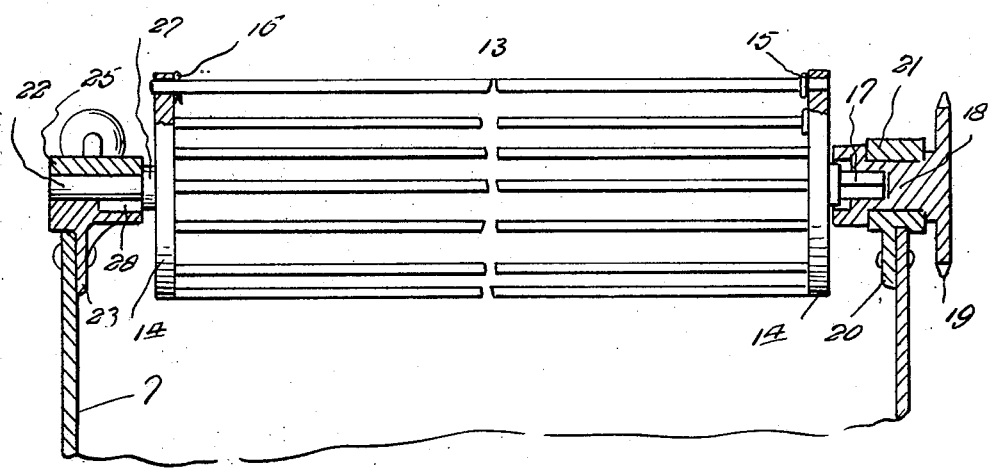
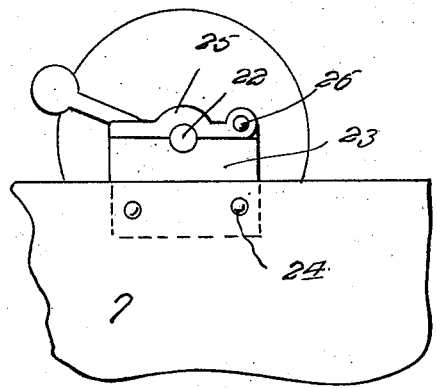
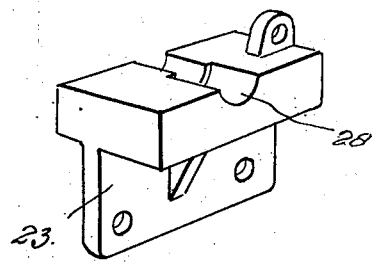
C. C. Clement,
Inventor.

Patented Apr. 29, 1924.

1,491,945

UNITED STATES PATENT OFFICE.

CHARLES CLINTON CLEMENT, OF SHELBURN, INDIANA.

BARBECUE STOVE.

Application filed November 14, 1923. Serial No. 674,701.

*To all whom it may concern:*

Be it known that I, CHARLES C. CLEMENT, a citizen of the United States, residing at Shelburn, in the county of Sullivan and State of Indiana, have invented certain new and useful Improvements in Barbecue Stoves, of which the following is a specification.

This invention relates to certain new and useful improvements in barbecue stoves, and has for its object to provide a device of this character, by means of which the product may be effectively displayed while being barbecued.

Another object of the invention is to provide a barbecue stove, embodying meat supporting frames arranged and operated so as to prevent burning of the meat and to barbecue the same evenly and thoroughly without scorching.

A further object of the invention is to provide a device of the above kind which may be constructed of light weight, so that the same may be readily transported from place to place, and which is well adapted for use both indoors and out of doors.

Other objects will become apparent as the nature of the invention is better understood, and the same consists in the novel form, combination, and arrangement of parts, hereinafter more fully described, shown in the accompanying drawings and claimed.

In the drawings, wherein like reference characters indicate corresponding parts throughout the several views:

Figure 1 is a side elevational view of a barbecue stove constructed in accordance with the present invention.

Figure 2 is a horizontal sectional view, taken substantially upon the line 2—2 of Figure 1.

Figure 3 is an enlarged fragmentary transverse sectional view, taken substantially upon the line 3—3 of Figure 1.

Figure 4 is an enlarged fragmentary side elevational view, looking toward the right of Figure 3, and Figure 5 is a perspective view of the lower section of the bearing for an end shaft of each of the rotary meat supporting cylinders or frames.

Referring more in detail to the drawing, the invention embodies a plurality of suitably constructed fire pots 5, 6, and 7, that are suitably rigidly connected in contiguous step by step relation as shown in Figure 1, by bolting or otherwise as indicated at 8, in Figure 2, each fire pot being provided with a bottom ash and draft door 9 and having any suitable form of grate mounted therein above the level of said door as generally indicated by dotted lines at 10 in Figure 1. A multiple rigid fire pot unit is thus provided, which may be readily knocked down for storage or transportation purposes, and this unit may be supported in a substantially horizontal or proper position at a required elevation by means of a step supporting base 11 having supporting legs 12.

The fire pots 5, 6, and 7 are open at the tops of the same and journalled upon the side or end walls of each fire pot at the top of the latter is a foraminous cylinder or cylindrical frame 13 that preferably consists of a pair of end discs 14 connected by a circular series of horizontal rods, some of which are removable as indicated at Figure 3 for permitting the meat to be placed within or removed from said cylinder. For this purpose, certain of the rods may be provided with shoulders as at 15 adjacent one end, to limit movement of this end into apertures of the adjacent series, while the other end thereof is slidably disposed in an opposed opening of the other disc and held against outward sliding movement by means of a removable key or cotter pin 16.

One disc 14 of each cylinder is provided with a squared stub shaft 17 fitted within a similar socket provided in a stub shaft 18 of a sprocket gear 19, which stub shaft 18 is journalled in a bearing comprising a lower bearing section or plate 20 fixed to the adjacent side of the adjacent fire pot, and associated with a hinged bearing cap 21 that is bolted to the lower section 20 of said bearing. The other disc 14 of each drum is provided with a cylindrical stub shaft 22 that is journalled in a bearing including a lower bearing section 23 pivoted or otherwise secured as at 24 to the adjacent side or end of the fire pot. This bearing further includes bearing caps 25 that is hinged at one end to the bearing section 23 as at 26, and that normally has its inner edge disposed in contact with the adjacent side of an enlargement 27 provided on the inner end of the stub shaft 22 whereby the stub shaft 17 at the opposite end of the cylinder is held within the square socket of the shaft 18. The inner portion of the bearing surface of the plate 23 is made of larger diameter as indicated at 28, so that when the bearing cap 25 is raised, the enlargement 27 may move into the enlarged portion 28 of said surface by imparting an endwise movement of the cylinder toward this side of the device, whereby the squared shaft 17 at the opposite end of the cylinder may be withdrawn from the socket of the shaft 18. In this manner, any desired one or more of the cylinders may be removed when it is desired to dispense with the same, without interfering with the continued operation of the remaining one or more of said cylinders.

An endless sprocket chain 29 passes around the sprocket wheels 19 of the end cylinders and over and under the socket wheel 19 of the intermediate cylinder, while the shaft 18 of the intermediate cylinder is extended outwardly beyond the sprocket wheel 19 thereof, where it is provided with a further socket wheel 30 as shown in Figures 1 and 2. A slow speed motor of any desired type such as the electric motor 31 that is mounted on the base 11 may be operatively connected with the sprocket wheel 30 thru a sprocket gearing including a chain 32 for rotatably driving one of the cylinders, preferably the intermediate one thereof. At the four corners of the construction described, or at the front corners of the fire pot 5 and the rear corners of the fire pot 7 adjacent the upper edges of the latter, are secured sockets 33 that are arranged in vertical positions for reception of the lower ends of supporting posts or rods 34, upon the upper ends of which is mounted a canopy 35 having an outlet flue 36 through which the fumes and products of combustion collected in the hood 37 may be conveyed to a desired point of disposal. The movement of the lower ends of the posts 34 into the sockets 33 may be limited to a proper degree by the provision of shoulders 37 upon said ends of the posts 34.

From the above description it will be seen that the bolts 8 may be removed for permitting separation of the fire pot, while the latter may be removed from the supporting base 11. In a like manner, the rods 34 may be disconnected from the fire pot to permit removal of the hood 35. Thus, the device may be compactly stored for shipment or other purposes when not in use.

In use, a fire is build upon a desired one or more of the grates 10 of the several fire pots, after which the rods of the cylinders which are removably held as at 15 and 16 are disengaged for permitting insertion of the meat within the cylinder, after which said releasable rods are again placed in position as shown in Figure 3. The motor 31 is then started so as to rotate the several cylinders thru the gearing described, whereupon the meat will be slowly turned for insuring roasting of the meat in an even manner without burning or scorching. Due to the rotation of the meat and the stepped relation of the fire pot, the product will be effectively displayed so as to attract attention. It will thus be evidenced that the device may serve effectively as an advertising medium.

From the foregoing, it is believed that the construction and operation, as well as the advantages of the present invention will be readily understood and appreciated by those skilled in the art.

Minor changes may be made without departing from the spirit and scope of the invention as claimed.

What I claim as new is:

1. In a barbecue stove of the character described, a plurality of open top fire pots rigidly supported in stepped relation, meat supporting elements at the tops of said fire pots, said meat supporting elements comprising rotatable foraminous cylinders, and means for rotating said cylinders.

2. In a barbecue stove of the character described, a plurality of open top fire pots rigidly supported in stepped relation, meat supporting elements at the tops of said fire pots, said meat supporting elements comprising rotatable foraminous cylinders, and means to rotate said cylinders, and means to permit rendering any desired one or more of said cylinders inoperative at will.

3. In a barbecue stove of the character described, a stepped supporting base, a plurality of open top fire pots arranged in stepped relation upon said base, means rigidly and detachably connecting said fire pots to each other, and meat supporting frames at the tops of said fire pots.

4. In a barbecue stove of the character described, a stepped supporting base, a plurality of open top fire pots arranged in stepped relation upon said base, means rigidly and detachably connecting said firepots to each other, meat supporting frames at the tops of said fire pots, said meat supporting frames comprising rotatable elements provided with means for rotating the same.

5. In a barbecue stove of the character described, a stepped supporting base, a plurality of open top fire pots arranged in stepped relation upon said base, means rigidly and detachably connecting said fire pots to each other, meat supporting frames at the tops of said fire pots, and a hood removably supported by said fire pot above the latter and provided with an outlet flue.

In testimony whereof I affix my signature.

CHARLES CLINTON CLEMENT.